United States Patent
Qian et al.

(10) Patent No.: US 11,512,219 B2
(45) Date of Patent: Nov. 29, 2022

(54) AQUEOUS COATING COMPOSITION

(71) Applicants: Dow Global Technologies LLC, Midland, MI (US); Rohm and Haas Company, Collegeville, PA (US)

(72) Inventors: Zhen Qian, Anhui (CN); Wei Cui, Shanghai (CN); Jianming Xu, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 335 days.

(21) Appl. No.: 16/635,049

(22) PCT Filed: Jul. 31, 2017

(86) PCT No.: PCT/CN2017/095163
§ 371 (c)(1),
(2) Date: Jan. 29, 2020

(87) PCT Pub. No.: WO2019/023845
PCT Pub. Date: Feb. 7, 2019

(65) Prior Publication Data
US 2020/0248027 A1 Aug. 6, 2020

(51) Int. Cl.
| | | |
|---|---|---|
| *C09D 133/08* | (2006.01) | |
| *C09D 5/00* | (2006.01) | |
| *C09D 191/06* | (2006.01) | |
| *B05D 5/08* | (2006.01) | |

(52) U.S. Cl.
CPC ............ *C09D 133/08* (2013.01); *B05D 5/08* (2013.01); *C09D 5/00* (2013.01); *C09D 191/06* (2013.01)

(58) Field of Classification Search
CPC ...... C09D 133/08; C09D 5/00; C09D 191/06; B05D 5/08
USPC ........................................................ 524/487
See application file for complete search history.

(56) References Cited

U.S. PATENT DOCUMENTS

| | | | |
|---|---|---|---|
| 2003/0220444 A1 | 11/2003 | Furuta et al. | |
| 2013/0035430 A1* | 2/2013 | Li | ........... C09D 5/028 977/773 |
| 2013/0047892 A1 | 2/2013 | Palmer, Jr. | |
| 2014/0100331 A1 | 4/2014 | Ahrens | |
| 2014/0323753 A1* | 10/2014 | Ogasawara | ........... C07F 9/3808 558/186 |
| 2015/0073080 A1 | 3/2015 | Wu et al. | |
| 2017/0327602 A1 | 11/2017 | Ogasawara et al. | |
| 2019/0315997 A1* | 10/2019 | Cui | ........... C08K 5/52 |

FOREIGN PATENT DOCUMENTS

| | | |
|---|---|---|
| BR | PI0924063 A2 | 7/2015 |
| CN | 102964898 | 3/2013 |
| CN | 102272214 B | 10/2013 |
| CN | 101977974 B | 5/2014 |
| CN | 103797034 | 5/2014 |
| CN | 104105727 | 10/2014 |
| CN | 105612223 | 5/2016 |
| EP | 1240267 B1 | 7/2009 |
| JP | 06114867 B1 | 4/2017 |
| TW | 201617130 | 5/2016 |
| WO | 2013059765 A1 | 4/2013 |
| WO | 2015051514 | 4/2015 |

OTHER PUBLICATIONS

"Technical Data Sheet", Micro Powders, Inc., dated: Oct. 2014; 1 page.
European Search Report for the corresponding Application No. EP17920011; dated Feb. 15, 2021; 9 pages.
Fox, T.G., Bulletin of the American Physical Society, 1956, p. 123, vol. 1, No. 3.
Peyer, P., "Glass Transition Temperatures of Polymers," Polymer Handbook, p. 214-227, Interscience Publishers.

* cited by examiner

*Primary Examiner* — Kelechi C Egwim
(74) *Attorney, Agent, or Firm* — Karl E. Stauss; Cantor Colburn LLP

(57) ABSTRACT

The present invention provides a high PVC aqueous coating composition that provides coatings with improved beading effect and good stain resistance.

11 Claims, No Drawings

AQUEOUS COATING COMPOSITION

FIELD OF THE INVENTION

The present invention relates to an aqueous coating composition and a method of improving the beading effect of a substrate by using the same.

INTRODUCTION

Beading effect (also known as "water repellency") and stain resistance are key performance requirements for coating films. Beading effect is coating films' resistance to being wetted by water, resistance to being adhered by water on the coating films, and how easily water can be removed from the coating films.

In the coating industry, one of the commonly used and highly effective additives to repel water is wax. Wax tends to migrate to the surface of dry coating films and reduces the surface tension, thereby improving beading effect. WO2015/051514A1 relates to a coating composition comprising, by dry weight based on the total dry weight of the coating composition, i) from 12% to 80% of polymer particles comprising, as polymerized units, by dry weight based on the total dry weight of the polymer particles, from 25% to 90%, of a vinyl acetate; and from 5% to 75%, of a vinyl ester of versatic acid and/or a vinyl ester of 2-ethyl hexanoic acid; and ii) from 0.1% to 6% of a wax; and iii) from 14% to 55% of a pigment. Such coating composition with a pigment volume concentration (PVC) of 35.7% achieved improved liquid stain repellency. However, when the PVC of coating compositions increases to higher than 55% (i.e., high PVC coating compositions), the water repellency of coating films needs to be further improved.

It is therefore desired to provide a high PVC aqueous coating composition that can provide coating films made therefrom with improved beading effect as well as good stain resistance.

SUMMARY OF THE INVENTION

The present invention provides a novel high PVC aqueous coating composition by combining a specific emulsion polymer, a wax emulsion, and a pigment. The aqueous coating composition having a high pigment volume concentration (PVC), e.g., 56% or higher, can provide coatings with surprisingly improved beading effect with a beading score of 4 or above, and good stain resistance with a stain removal score of 25 or higher. The beading effect and stain resistance properties may be measured according to the test methods described in the Examples section below.

In a first aspect, the present invention is an aqueous coating composition comprising:

(A) an emulsion polymer comprising, based on the dry weight of the emulsion polymer, structural units of a polymerizable surfactant having the structure of formula (I),

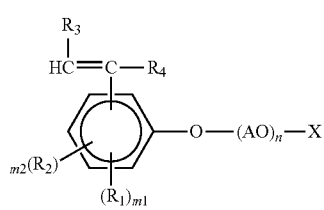

(I)

wherein $R_1$ is a phenyl group or a phenyl substituted alkyl group; m1 is 1, 2, 3 or 4; $R_2$ is an alkyl or a substituted alkyl; m2 is 0 or 1; $R_3$ is hydrogen or a $C_1$-$C_{20}$ alkyl group; $R_4$ is hydrogen or a $C_1$-$C_{20}$ alkyl group; A represents an alkylene group or a substituted alkylene group, having 2 to 4 carbon atoms; n is an integer in the range of from 1 to 100; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$-COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue;

(B) a wax emulsion in an amount of from 1.1% to 20% by solids weight, based on the dry weight of the emulsion polymer; and (C) a pigment, wherein the aqueous coating composition has a pigment volume concentration of from 56% to 70%.

In a second aspect, the present invention is a method of improving the beading effect of a substrate. The method comprises:

forming an aqueous coating composition of the first aspect, applying the aqueous coating composition to a substrate, and drying, or allowing to dry the aqueous coating composition, wherein the coated substrate has improved beading effect.

DETAILED DESCRIPTION OF THE INVENTION

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" in the present invention can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Structural units", also known as "polymerized units", of the named monomer, refers to the remnant of the monomer after polymerization, that is, polymerized monomer or the monomer in polymerized form.

The aqueous coating composition of the present invention comprise an emulsion polymer, typically present in an aqueous dispersion. The emulsion polymer useful in the present invention comprises structural units of one or more polymerizable surfactants. The polymerizable surfactant may have the structure of formula (I),

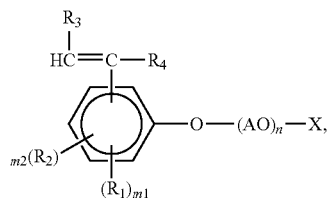

(I)

wherein $R_1$ is a phenyl group or a phenyl substituted alkyl group;

m1 is 1, 2, 3 or 4, preferably from 1 to 3;

$R_2$ is an alkyl or a substituted alkyl, preferably a $C_1$-$C_4$ alkyl or a substituted $C_1$-$C_4$ alkyl;

m2 is 0 or 1, preferably 0;

$R_3$ is hydrogen or a $C_1$-$C_{20}$ or $C_1$-$C_4$ alkyl group such as methyl;

$R_4$ is hydrogen or a $C_1$-$C_{20}$ or $C_1$-$C_4$ alkyl group such as methyl;

A represents an alkylene group or a substituted alkylene group, having 2 to 4 carbon atoms, such as ethylene, propylene, and butylene; preferably, an ethylene group;

n represents an average addition mole number of alkylene oxide. n is an integer of 1 or more, 2 or more, 3 or more, 4 or more, or even 5 or more, and at the same time, 100 or less, 60 or less, 50 or less, 40 or less, or even 20 or less; preferably, from 5 to 20; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$-COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue. Preferably, X represents —$SO_3M$.

In some embodiments, A is an ethylene group and n is an integer ranging from 5 to 20.

In one preferred embodiment, the polymerizable surfactant has the structure of formula

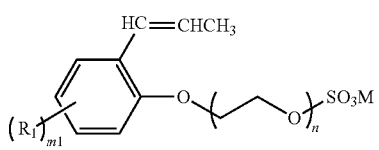

(II)

wherein $R_1$, $m_1$, and n are as defined above in formula (I), and M is a counter ion such as $NH_4^+$, $Li^+$, $Na^+$ or $K^+$.

In formula (I) or (II), preferred $R_1$ is a phenyl substituted alkyl group having the structure of

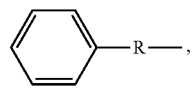

wherein R is an alkylene group having one to four carbon atoms, preferably two to three carbon atoms, such as for example,

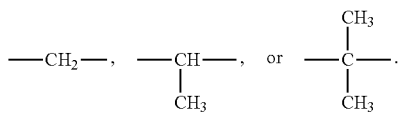

Preferred m1 is 3. More preferably, in formula (II), m1 is 3; n is an integer ranging from 5 to 20; and $R_1$ is

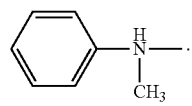

Suitable commercially available polymerizable surfactants include HITENOL AR-1025 alkylphenol polyethoxylates (APEO) free ethoxylated styrenated phenol sulfate polymerizable surfactant available from Dai-Ichi Kogyo Seiyaku Co., Ltd. The emulsion polymer useful in the present invention may comprise, based on the dry weight of the emulsion polymer, 0.5% by weight or more, 0.75% by weight or more, 1.0% by weight or more, 1.1% by weight or more, 1.2% by weight or more, 1.3% by weight or more, or even 1.5% by weight or more, and at the same time, 5% by weight or less, 4.5% by weight or less, 4% by weight or less, 3.5% by weight or less, 3% by weight or less, 2.5% by weight or less, or even 2% by weight or less, of structural units of the polymerizable surfactant.

The emulsion polymer useful in the present invention may further comprise structural units of one or more ethylenically unsaturated monomers carrying at least one functional group (hereinafter "functional-group-containing ethylenically unsaturated monomer"). The functional groups may be selected from a carbonyl, acetoacetoxy, acetoacetamide, ureido, amide, imide, amino, carboxyl, hydroxyl, or phosphorous group. Examples of suitable additional functional-group-containing ethylenically unsaturated monomer include α,β-ethylenically unsaturated carboxylic acids including an acid-bearing monomer such as methacrylic acid, acrylic acid, itaconic acid, maleic acid, or fumaric acid; or a monomer bearing an acid-forming group which yields or is subsequently convertible to, such an acid group such as anhydride, (meth)acrylic anhydride, or maleic anhydride; acetoacetoxyethyl methacrylate (AAEM); vinyl phosphonic acid, allyl phosphonic acid, phosphoalkyl (meth)acrylates such as phosphoethyl (meth)acrylate, phosphopropyl (meth)acrylate, phosphobutyl (meth)acrylate, or salts thereof; 2-acrylamido-2-methyl-1-propanesulfonic acid; sodium salt of 2-acrylamido-2-methyl-1-propanesulfonic acid; ammonium salt of 2-acrylamido-2-methyl-1-propane sulfonic acid; sodium styrene sulfonate; sodium vinyl sulfonate; sodium salt of allyl ether sulfonate; and the like; diacetone acrylamide (DAAM), acrylamide, methacrylamide, mono-substituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide, methylacrylamidoethyl ethylene urea, hydroxy-functional (meth) acrylic acid alkyl ester such as hydroxyethyl methacrylate and hydroxypropyl methacrylate, or mixtures thereof. Preferred functional-group-containing ethylenically unsaturated monomers are selected from acrylic acid, methacrylic acid, acrylamide, sodium p-styrene sulfonate, or mixtures thereof. The emulsion polymer may comprise, based on the dry weight of the emulsion polymer, from 0.3% to 20% by weight, from 0.5% to 10% by weight, or from 1.0% to 8.0% by weight, of structural units of the functional-group-containing ethylenically unsaturated monomer.

The emulsion polymer useful in the present invention may also comprise structural units of one or more ethylenically unsaturated nonionic monomers that are different from the functional-group-containing ethylenically unsaturated monomer. As used herein, the term "nonionic monomers" refers to monomers that do not bear an ionic charge between pH=1-14. Suitable ethylenically unsaturated nonionic monomers may include, for example, monoethylenically unsaturated nonionic monomers include alkyl esters of (methyl) acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, (meth)acrylonitrile, or mixtures thereof. Preferably, the ethylenically unsaturated nonionic monomers are selected from the group consisting of methyl methacrylate, ethyl acrylate, butyl acrylate, 2-ethylhexyl acrylate, and styrene. The emulsion polymer may comprise, based on the dry weight of the emulsion polymer, from 71% to 97.7% by weight or from 83% to 97% by weight, of structural units of the ethylenically unsaturated nonionic monomers.

In some embodiments, the emulsion polymer comprises, based on the dry weight of the emulsion polymer, from 1% to 3% by weight of structural units of the polymerizable surfactant, from 1% to 6% of structural units of the ethylenically unsaturated monomers carrying at least one functional group;

from 30% to 55% by weight of structural units of styrene; and from 36% to 68% by weight of structural units of alkyl esters of (methyl) acrylic acids such as methyl methacrylate, ethyl acrylate, butyl acrylate, 2-ethylhexyl acrylate, or mixtures thereof.

The emulsion polymer useful in the present invention may be prepared by emulsion polymerization of a mixture of monomers comprising the polymerizable surfactant and other monomers described above. Total weight concentration of the polymerizable surfactant and other monomers described above for preparing the emulsion polymer is equal to 100%. The mixture of monomers, may be added neat or as an emulsion in water; or added in one or more additions or continuously, linearly or nonlinearly, over the reaction period of preparing the emulsion polymer. Temperature suitable for emulsion polymerization process may be lower than 100° C., in the range of from 30° C. to 95° C., or in the range of from 50° C. to 90° C.

In the polymerization process of preparing the emulsion polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the emulsion polymer, one or more additional surfactants may be used. The additional surfactants are different from the polymerizable surfactant described above having the structure of formula (I). The additional surfactant may be added prior to or during the polymerization of the monomers, or combinations thereof. A portion of the additional surfactant can also be added after the polymerization. These additional surfactants may include anionic and/or nonionic emulsifiers. Examples of suitable additional surfactants include RHODAFAC RS-610 alkyl ethoxylated phosphate available from Solvay S. A., DISPONIL FES 32 fatty alcohol ether sulfate available from BASF, TERGITOL™ 15-S-40 secondary alcohol ethoxylate available from Dow Chemical Company (TERGITOL is a trademark of The Dow Chemical Company). The additional surfactant used is usually from 0 to 3% by weight, from 0.5% to 2.5%, or from 0.7% to 1.5% by weight, based on the weight of the monomer mixture used for preparing the emulsion polymer.

In the polymerization process of preparing the emulsion polymer, a chain transfer agent may be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the emulsion polymer. The chain transfer agent may be used in an amount from 0 to 1% by weight, from 0.1% to 0.5% by weight, or from 0.15% to 0.4% by weight, based on the weight of the monomer mixture used for preparing the emulsion polymer.

After completing the polymerization of the emulsion polymer, the obtained emulsion polymer may be neutralized by one or more bases as neutralizers to a pH value, for example, at least 6, from 6 to 10, or from 7 to 9. The bases may lead to partial or complete neutralization of the ionic or latently ionic groups of the emulsion polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The emulsion polymer useful in the present invention may have an average particle size of from 50 nanometers (nm) to 500 nm, from 80 nm to 200 nm, or from 90 nm to 150 nm, as measured by a Brookhaven BI-90 or 90Plus Particle Sizer.

The aqueous coating composition of the present invention may further comprise one or more wax emulsions. The wax emulsion can be polyethylene (PE) wax such as high density polyethylene (HDPE) wax, polypropylene (PP) wax, carnauba wax, paraffin wax, polyethylene acrylic acid wax, or mixtures thereof. Suitable commercially available wax emulsions include, for example, MICHEM ME 62330 paraffin/PE wax emulsion, MICHEM ME 34935 paraffin/ethylene acrylic acid wax emulsion, MICHEM 180 a blend of paraffin and carnauba wax, and MICHEM ME 71450 paraffin wax emulsion all available from Michelman Inc.; ULTRALUBE E340 paraffin wax emulsion and ULTRALUBE E668H PP wax emulsion both available from Keim-Additec; or mixtures thereof.

In one embodiment, a paraffin wax emulsion is used. Preferably, the paraffin wax emulsion is a melted refined paraffin wax, or its blend with other materials. The paraffin wax typically has a melting temperature of 46° C. to 71° C. Solids of the paraffin wax emulsion can vary from 1% to 60% by weight or from 30% to 55% by weight. The pH of the wax emulsion can range from 6 to 10, typically 7.9 to 9.8, but is dependent on the process used. Particle size of the paraffin wax emulsion can vary between 0.02 to 1.5 microns. The paraffin wax emulsion can be prepared by melting refined paraffin wax to a temperature above the melting point of the paraffin. Appropriate emulsifiers, such as stearic acid, oleic acid, diethylamine ethanol, 2-amino-2-methyl-1-propanol, can then be added into the molten wax and water mixture with agitation at elevated temperatures. A base, such as potassium hydroxide or ammonium hydroxide, can then be dissolved in ethylene glycol or water at elevated temperatures and slowly added to the resultant mixture while increasing the speed of agitation. After all the water/base mixture has been added to the molten wax, the resulting wax in water emulsion can be passed through a homogenizer to further adjust particle size of the wax emulsion. After homogenization, the resulting wax emulsion is cooled, for example, through a heat exchanger, and then filtered and packaged.

The wax emulsion useful in the present invention may have an average particle size of from 10 nm to 1,000 nm, 30 nm to 500 nm, from 50 nm to 200 nm, as measured by a Brookhaven BI-90 or 90Plus Particle Sizer. The aqueous coating composition of the present invention may comprise, by solids weight based on the dry weight of the emulsion polymer, 1.1% or more, 1.2% or more, 1.5% or more, 1.6% or more, 1.7% or more, 1.8% or more, 1.9% or more, 2% or more, 2.5% or more, or even 3% or more, and at the same time, 20% or less, 18% or less, 15% or less, 10% or less, 8% or less, 6% or less, 5.5% or less, 5% or less, 4.5% or less, or even 4% or less, of the wax emulsion.

The aqueous coating composition of the present invention may also comprise one or more pigments. As used herein, the term "pigment" refers to a particulate inorganic material which is capable of materially contributing to the opacity or hiding capability of a coating. Such materials typically have a refractive index greater than 1.8 and include inorganic pigments and organic pigments. Examples of suitable inorganic pigments include titanium dioxide ($TiO_2$), zinc oxide, zinc sulfide, iron oxide, barium sulfate, barium carbonate, or mixtures thereof. Preferred pigment used in the present invention is $TiO_2$. $TiO_2$ may be also available in concentrated dispersion form.

The aqueous coating composition of the present invention may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof.

The aqueous coating composition of the present invention may have a pigment volume concentration (PVC) of 56% or more, 57% or more, 58% or more, 59% or more, or even 60% or more, and at the same time, 70% or less, 69% or less, 68% or less, 67% or less, 66% or less, or even 65% or less. PVC of a coating composition may be determined according to the following equation:

$$PVC = \frac{\text{volume of pigment}(s) + \text{volume of extender}(s)}{\text{total dry volume of coating composition}} * 100\%$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The defoamer may be present, by weight based on the total weight of the aqueous coating composition, in an amount of generally from 0 to 0.5%, from 0.05% to 0.4%, or from 0.1% to 0.3%.

The aqueous coating composition of the present invention may further comprise one or more thickeners, also known as "rheology modifiers". The thickeners may include polyvinyl alcohol (PVA), acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is selected from HASE, HEC, HEUR, or mixtures thereof. The thickener may be present, based on the total weight of the aqueous coating composition, in an amount of generally from 0 to 3.0% by weight, from 0.1% to 1.5% by weight, or from 0.2% to 1.2% by weight.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, TRITON™ CF-10 nonionic surfactant available from The Dow Chemical Company (TRITON is a trademark of The Dow Chemical Company), SURFYNOL 10 nonionic wetting agent based on an actacetylenic diol available from Air Products, BYK-346 and BYK-349 polyether-modified siloxanes both available from BYK, or mixtures thereof. The wetting agent may be present, based on the total weight of the aqueous coating composition, in an amount of from 0 to 1.0% by weight, from 0.1% to 0.8% by weight, or from 0.2% to 0.6% by weight.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include TEXANOL ester alcohol available from Eastman Chemical Company, Coasol and Coasol 290 Plus coalescents available from Chemoxy International Ltd., dipropylene glycol n-butyl ether, ethylene glycol monobutyl ether, diethylene glycol monobutyl ether, n-butyl ether, or mixtures thereof. The coalescent may be present, based on the total weight of the aqueous coating composition, in an amount of from 0 to 3.0% by weight, from 0.1% to 2.0% by weight, or from 0.2% to 1.5% by weight.

The aqueous coating composition of the present invention may further comprise one or more dispersants. The dispersants may include non-ionic, anionic and cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The molecular weight of such polyacids may be in the range of from 1,000 to 50,000, from 1,200 to 40,000, from 1,500 to 20,000, from 2,000 to 15,000, or from 2,500 to 10,000, as measured by Gel Permeation Chromatography (GPC) (column: One PLgel GUARD columns (10 μm, 55×7.5 mm) and One Mixed B columns (7.8×300 mm) in tandem; and calibration: PL Polystyrene Narrow standards with molecular weights ranging from 2329000 to 580 g/mol, using polynom 3 fitness). The dispersant may be present, based on the total weight of the aqueous coating composition, in an amount of from 0 to 1.0% by weight, from 0.1% to 0.8% by weight, or from 0.2% to 0.6% by weight.

In addition to the components described above, the aqueous coating composition of the present invention may further comprise any one or combination of the following additives: buffers, neutralizers, humectants, mildewcides, biocides, anti-skinning agents, colorants, flowing agents, crosslinkers, anti-oxidants, plasticizers, leveling agents, thixotropic agents, adhesion promoters, and grind vehicles. When present, these additives may be present in a combined amount of from 0 to 1% by weight or from 0.1% to 0.8% by weight, based on the total weight of the aqueous coating composition.

The aqueous coating composition of the present invention may further comprise water. The concentration of water may be, by weight based on the total weight of the coating composition, from 30% to 90%, from 40% to 80%, or from 50% to 70%.

The aqueous coating composition of the present invention may be prepared by admixing the emulsion polymer, the wax emulsion, the pigment, and optionally, other components described above. Components in the aqueous coating composition may be mixed in any order to provide the aqueous coating composition of the present invention. Any of the above-mentioned optional components may also be added to the composition during or prior to the mixing to form the aqueous coating composition. The pigments and/or extenders are preferably mixed with the dispersant to form a slurry of pigments and/or extender.

The aqueous coating composition of the present invention has good heat-age stability, for example, the medium shear viscosity change of the aqueous coating composition is less than 10 Krebs units (KU) after storage at 50° C. for 10 days or more, or up to 30 days, as measured by a Stormer Viscosity Meter according to the ASTM D562 method.

The aqueous coating composition of the present invention can provide a coating obtained therefrom with good beading effect, even when the aqueous coating composition has a PVC as high as 56% or higher, 57% or higher, or even 58% or higher (also called "high PVC aqueous coating composition"). "Good beading effects" or "improved beading effects" used in the present invention refers to a coating or a coated substrate that achieves a beading effect score of 4 or higher. The aqueous coating composition can also provide coatings with good stain resistance as indicated by a stain removal score of 25 or higher. The beading effect and stain resistance may be measured according to the test methods described in Examples section below.

The present invention also relates to a method of improving beading effect of a substrate. The method comprises: forming the aqueous coating composition, applying the aqueous coating composition to a substrate, and drying, or allowing to dry the aqueous coating composition, wherein the coated substrate has improved beading effect as described above. Drying, or allowing to dry, the applied aqueous coating composition forms a coating. The aqueous coating composition can be applied to, and adhered to, various substrates. Examples of suitable substrates include wood, metals, plastics, foams, stones, elastomeric substrates, glass, wall paper, fabrics, medium-density fiberboard (MDF), particle board, gypsum board, concrete, or cementious substrates. The aqueous coating composition can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition has been applied to a substrate, the coating composition can dry, or allow to dry, to form a film (this is, coating) at room temperature (20-25° C.), or at an elevated temperature, for example, from 35° C. to 60° C. The coating composition can be used alone, or in combination with other coatings to form multi-layer coatings.

The aqueous coating composition of the present invention are useful as coatings on various substrates, where good beading effect and good stain resistance are important, such as those surfaces which are routinely exposed to the outdoors. The aqueous coating composition is suitable for various applications such as marine and protective coatings, automotive coatings, traffic paint, Exterior Insulation and Finish Systems (EIFS), roof mastic, wood coatings, coil coatings, plastic coatings, can coatings, architectural coatings, and civil engineering coatings. The aqueous coating composition is particularly useful for architectural coatings.

EXAMPLES

Some embodiments of the invention will now be described in the following Examples, wherein all parts and percentages are by weight unless otherwise specified.

Styrene ("ST"), butyl acrylate ("BA"), sodium styrene sulfonate ("SSS"), and acrylic acid ("AA") are all available from The Dow Chemical Company.

HITENOL AR-1025 ("AR-1025") surfactant (active 25%), available from Dai-Ichi Kogyo Seiyaku Co., Ltd., is APEO free polyoxyethylene styrenated tri-propenyl phenyl ether sulfate ammonium salt.

ADEKA REASOAP PP-7025 ("PP-7025") surfactant (active 25%), available from ADEKA (Shanghai) Co., Ltd., is α-(2-propenyloxy)-ω-hydroxy-poly(propylene oxide) phosphate.

MAXEMUL 6112 reactive surfactant, available from Croda, is a vinyl alkyl phosphate ester.

ADEKA REASOAP SR-10 ("SR-10") reactive surfactant (active 25%), available from ADEKA (Shanghai) Co., Ltd., is an anionic polymerizable emulsifier, poly(oxy-1,2-ethanediyl), alpha-sulfo-omega-1-(hydroxymethyl)-2-(2-propenyloxy)ethoxy]-, alkyl ethers ammonium salts.

RHODACAL DS-4 ("DS-4") surfactant (active 22%), available Rhodia (China) Investment Co., Ltd., is sodium dodecyl (branched) benzene sulfonate.

ULTRALUBE E-340 ("E-340") wax emulsion, available from Keim-Additec Company, is a paraffin wax emulsion with a solids content of 50%.

NATROSOL 250 HBR hydroxyethyl cellulose (HEC), available from Ashland Company, is used as a thickener.

AMP-95, available from Angus Company, is used as a neutralizer.

Propylene glycol is available from Sinopharm Chemical Reagent Co., Ltd.

OROTAN™ 731A dispersant, KATHON™ LXE biocide, ROPAQUE Ultra E opaque polymer, TRITON CF-10 wetting agent, ACRYSOL™ RM-2020 NPR HEUR thickener, ACRYSOL ASE-60 HASE thickener and ACRYSOL RM-8W HEUR thickener are all available from The Dow Chemical Company (OROTAN, KATHON and ACRYSOL are all trademarks of The Dow Chemical Company).

NOPCO NXZ defoamer is available from San Nopco Ltd.

Ti-Pure R-706 titanium dioxide, available from DuPont Company, is used as a pigment.

CC-700 calcium carbonate, available from Guangfu Building Materials Group, is used as an extender.

TEXANOL ester alcohol, available from Eastman Chemical Company, is used as a coalescent.

The following standard analytical equipment and methods are used in the Examples.

Beading Effect Evaluation

The beading effect evaluates the difficulty of wetting a coating surface with water. To determine the beading effect, a test coating composition was casted on a black vinyl chart P-121-10N (Leneta) and dried at room temperature (20-25° C.) for 2 days. The coated charts were kept vertical so that water drops were allowed to flow from the upper to the bottom side of the chart. The beading effect was visually rated and represented by beading scores as shown in Table 1 below. The beading score of 4 or higher indicates good beading effect. Otherwise, if the beading score is lower than 4, it indicates poor beading effect.

TABLE 1

| Ranking standard for beading effect | |
|---|---|
| Beading Score | Description |
| 5 | No wetting nor adhesion of water droplets observed on the coating surface |
| 4 | Wetting observed by individual small circular or elliptic water droplets observed on the coating surface |
| 3 | Wetting observed by individual large water droplets on the coating surface |
| 2 | Wetting observed along the discrete track of water on the coating surface |
| 1 | Wetting observed along the thinner track of water on the coating surface |
| 0 | Wetting observed along the entire track of water on the coating surface |

Stain Resistance

The stain resistance of coatings was evaluated according the ASTM D4828-94 method. A test coating composition was coated on black vinyl charts P-121-10N (Leneta) with a wet thickness of 175 μm, and allowed to dry for 7 days in a constant temperature room (CTR, 25° C., 50% relative humidity (R.H.)). Hydrophobic stains including lipstick, pencil, ball pen, crayon (blue), crayon (green), crayon (pink), respectively, were applied on the surface of the coatings.

Hydrophilic stains including red wine, coffee, black tea, green tea, and ink, respectively, were applied by a placing gauze saturated with the corresponding stains on the surface of the coatings and allowed to stay on the surface for 2 hours. Prior to the stain resistance test, excessive liquid stains were wiped off with a paper towel. The stain resistance test was then conducted on a modified scrub machine with a boat filled with a 3M commercial sponge saturated with 1% household detergent solution. 1 kilogram (Kg) weight was placed on the boat to ensure that all the samples were tested under the same pressure. Each sample chart was scrubbed for 100 cycles. Before ranking for stain resistance performance, the sample charts were rinsed using water followed by complete drying at room temperature. Stain resistance performance of the coatings was then evaluated by visual inspection by comparing the scrubbed side with the unscrubbed side, based on the standard described in Table 2.

The sum of stain removal scores for different tested stains for each coating was used to evaluate the stain resistance of such coating. The sum of the stain removal scores of 25 or higher indicates good stain resistance. Otherwise, if the sum of the stain removal scores is less than 25, it indicates that the coating has poor stain resistance. The higher the sum of stain removal score, the better the stain resistance of the coating.

TABLE 2

Ranking standard for stain resistance

Stain removal scores State

| | |
|---|---|
| 10 | No stain or trace stains left |
| 8 | 70% to 90% stain removed |
| 6 | 50% to 69% stain removed |
| 4 | Less than 50% removed or obvious stain marks left |
| 1~2 | Almost no stain removed |

Synthesis of Binder 1A-1F

A monomer emulsion (ME) was prepared by mixing 400 g of deionized (DI) water, 69 g of HITENOL AR-1025, 718.50 g of ST, 754.46 g of BA, 5.52 g of SSS, and 30.5 g of AA.

In a 5-liter, four necked round bottom flask equipped with a paddle stirrer, a thermometer, a nitrogen inlet and a reflux condenser, 510 g of DI water was added and heated to 90° C. under nitrogen atmosphere with stirring. 8.50 g of DS-4, 1.87 g of Na$_2$CO$_3$, and 51.7 g of ME were then added into the flask, quickly followed by 5.25 g of sodium persulfate dissolved in 14.7 g of DI water. Upon holding the batch for 1 minute with stirring, the remaining ME was added into the flask while co-feeding 2.12 g of sodium persulfate in 50 g DI water and 2.30 g of sodium bisulfite in 50 g of DI water in 120 minutes. When the ME feed was completed, a catalyst/activator feed (1.40 g of tert-Butyl hydroperoxide/0.7 g of iso-ascorbic acid) was added, and then another catalyst/activator feed (3 g of tert-butyl hydroperoxide/1.6 g of iso-ascorbic acid) was added to the flask in 40 minutes to chase the residual monomers separately. Then monoethanolamine (MEA) solution was added to adjust the pH to 8.0-8.5. At last, various amounts of E340 wax emulsion, as given in the table below, were post added slowly. The measured particle size of each binder composition was about 135 nm and solids content was about 50.90%.

| | Binder 1A | Binder 1B | Binder 1C | Binder 1D | Binder 1E | Binder 1F |
|---|---|---|---|---|---|---|
| Wax amount (g) | 186.5 | 31.08 | 62.17 | 93.25 | 310.83 | 466.25 |
| Wax (%)* | 6% | 1% | 2% | 3% | 10% | 15% |

*by solids weight based on the total weight of monomers (i.e., dry weight of the emulsion polymer)

Synthesis of Binder 2

A monomer Emulsion (ME) was prepared by mixing 400 g of DI water, 68.7 g of DS-4, 718.50 g of ST, 754.46 g of BA, 5.52 g of SSS, and 30.5 g of AA.

In a 5-liter, four necked round bottom flask equipped with a paddle stirrer, a thermometer, a nitrogen inlet and a reflux condenser, 510 g of DI water was added and heated to 90° C. under nitrogen atmosphere with stirring. 8.50 g of DS-4, 1.87 g of Na$_2$CO$_3$, and 51.7 g of ME were then added into the flask, quickly followed by 5.25 g of sodium persulfate dissolved in 14.7 g of DI water. Upon holding the batch for 1 minute with stirring, ME was added into the flask while co-feeding 2.12 g of sodium persulfate in 50 g DI water and 2.30 g of sodium bisulfite in 50 g of DI water in 120 minutes. When the ME feed was completed, a catalyst/activator feed (1.40 g of tert-butyl hydroperoxide/0.7 g of iso-ascorbic acid) was added, and then another catalyst/activator feed (3 g of tert-butyl hydroperoxide/1.6 g of iso-ascorbic acid) was added to the flask in 40 minutes to chase the residual monomers separately. Then MEA solution was added to adjust the pH to 8.0-8.5. At last, 186.5 g of E340 wax emulsion were post added slowly. The measured particle size of the resultant binder composition was about 150 nm and solids content was about 50.90%.

Synthesis of Binder 3

A monomer emulsion (ME) was prepared by mixing 400 g of DI water, 69 g of ADEKA REASOAP PP-7025, 718.50 g of ST, 754.46 g of BA, 5.52 g of SSS, and 30.5 g of AA.

In a 5-liter, four necked round bottom flask equipped with a paddle stirrer, a thermometer, a nitrogen inlet and a reflux condenser, 510 g of DI water was added and heated to 90° C. under nitrogen atmosphere with stirring. 8.50 g of DS-4, 1.87 g of Na$_2$CO$_3$, and 51.7 g of ME were then added into the flask, quickly followed by 5.25 g of sodium persulfate dissolved in 14.7 g of DI water. Upon holding the batch for 1 minute with stirring, the remaining ME was added into the flask while co-feeding 2.12 g of sodium persulfate in 50 g of 50 g of DI water and 2.30 g of sodium bisulfite in 50 g of DI water in 120 minutes. When the ME feed was completed, a catalyst/activator feed (1.40 g of tert-butyl hydroperoxide/ 0.7 g of iso-ascorbic acid) was added, and then another catalyst/activator feed (3 g of tert-butyl hydroperoxide/1.6 g of iso-ascorbic acid) was added to the flask in 40 minutes to chase the residual monomers separately. Then MEA solution was added to adjust the pH to 8.0-8.5. At last, 186.5 g of E340 wax emulsion were post added slowly. The measured particle size of the obtained binder composition was about 170 nm and solids content was about 51.90%.

Synthesis of Binder 4

A monomer emulsion (ME) was prepared by mixing 400 g of DI water, 69 g of MAXEMUL 6112, 718.50 g of ST, 754.46 g of BA, 5.52 g of SSS, and 30.5 g of AA.

In a 5-liter, four necked round bottom flask equipped with a paddle stirrer, a thermometer, a nitrogen inlet and a reflux condenser, 510 g of DI water was added and heated to 90° C. under nitrogen atmosphere with stirring. 8.50 g of DS-4, 1.87 g of Na$_2$CO$_3$, and 51.7 g of ME were then added into the flask, quickly followed by 5.25 g of sodium persulfate dissolved in 14.7 g of DI water. Upon holding the batch for 1 minute with stirring, the remaining ME was added into the flask while co-feeding 2.12 g of sodium persulfate in 50 g of DI water and 2.30 g of sodium bisulfite in 50 g of DI water in 120 minutes. When the ME feed was completed, a catalyst/activator feed (1.40 g of tert-butyl hydroperoxide/ 0.7 g of iso-ascorbic acid) was added, and then another catalyst/activator feed (3 g of tert-butyl hydroperoxide/1.6 g of iso-ascorbic acid) was added to the flask in 40 minutes to chase the residual monomers separately. Then MEA solution was added to adjust the pH to 8.0-8.5. At last, 186.5 g of E340 wax emulsion were post added slowly. The measured particle size of the obtained binder composition was about 150 nm and solids content was about 52.35%.

Synthesis of Binder 5

A monomer emulsion (ME) was prepared by mixing 400 g of DI water, 69 g of ADEKA REASOAP SR-10, 718.50 g of ST, 754.46 g of BA, 5.52 g of SSS, and 30.5 g of AA.

In a 5-liter, four necked round bottom flask equipped with a paddle stirrer, a thermometer, a nitrogen inlet and a reflux condenser, 510 g of DI water was added and heated to 90° C. under nitrogen atmosphere with stirring. 8.50 g of DS-4, 1.87 g of Na$_2$CO$_3$, and 51.7 g of ME were then added into the flask, quickly followed by 5.25 g of sodium persulfate dissolved in 14.7 g of DI water. Upon holding the batch for 1 minute with stirring, the remaining ME was added into the flask while co-feeding 2.12 g of sodium persulfate in 50 g of DI water and 2.30 g of sodium bisulfite in 50 g of DI water in 120 minutes. When the ME feed was completed, a catalyst/activator feed (1.40 g of tert-butyl hydroperoxide/ 0.7 g of iso-ascorbic acid) was added, and then another catalyst/activator feed (3 g of tert-butyl hydroperoxide/1.6 g of iso-ascorbic acid) was added to the flask in 40 minutes to chase the residual monomers separately. Then MEA solution was added to adjust the pH to 8.0-8.5. At last, 186.5 g of E340 wax emulsion were post added slowly. The measured particle size of the obtained binder composition was about 150 nm and solids content was about 52.41%.

Synthesis of Binder 6

A monomer emulsion (ME) was prepared by mixing 400 g of DI water, 69 g of HITENOL AR-1025, 718.50 g of ST, 754.46 g of BA, 5.52 g of SSS, and 30.5 g of AA.

In a 5-liter, four necked round bottom flask equipped with a paddle stirrer, a thermometer, a nitrogen inlet and a reflux condenser, 510 g of DI water was added and heated to 90° C. under nitrogen atmosphere with stirring. 8.50 g of DS-4, 1.87 g of Na$_2$CO$_3$, and 51.7 g of ME were then added into the flask, quickly followed by 5.25 g of sodium persulfate dissolved in 14.7 g of DI water. Upon holding the batch for 1 minute with stirring, the remaining ME was added into the flask while co-feeding 2.12 g of sodium persulfate in 50 g of DI water and 2.30 g of sodium bisulfite in 50 g of DI water in 120 minutes. When the ME feed was completed, a catalyst/activator feed (1.40 g of tert-butyl hydroperoxide/ 0.7 g of iso-ascorbic acid) was added, and then another catalyst/activator feed (3 g of tert-butyl hydroperoxide/1.6 g of iso-ascorbic acid) was added to the flask in 40 minutes to chase the residual monomers separately. Then MEA solution was added to adjust the pH to 8.0-8.5. The measured particle size of the obtained binder composition was about 120 nm and solids content was about 50.00%.

Synthesis Procedure of Binder 7

A monomer emulsion (ME) was prepared by mixing 400 g of deionized (DI) water, 68.7 g of DS-4, 718.50 g of ST, 754.46 g of BA, 5.52 g of SSS, and 30.5 g of AA.

In a 5-liter, four necked round bottom flask equipped with a paddle stirrer, a thermometer, a nitrogen inlet and a reflux condenser, 510 g of DI water was added and heated to 90° C. under nitrogen atmosphere with stirring. 8.50 g of DS-4, 1.87 g of Na$_2$CO$_3$, and 51.7 g of ME were then added into the flask, quickly followed by 5.25 g of sodium persulfate dissolved in 14.7 g of DI water. Upon holding the batch for 1 minute with stirring, the remaining ME was added into the flask while co-feeding 2.12 g of sodium persulfate in 50 g of DI water and 2.30 g of sodium bisulfite in 50 g of DI water in 120 minutes. When the ME feed was completed, a catalyst/activator feed (1.40 g of tert-butyl hydroperoxide/ 0.7 g of iso-ascorbic acid) was added, and then another catalyst/activator feed (3 g of tert-butyl hydroperoxide/1.6 g of iso-ascorbic acid) was added to the flask in 40 minutes to chase the residual monomers separately. Then MEA solution was added to adjust the pH to 8.0-8.5. The measured particle size of the obtained binder composition was about 180 nm and solids content was about 50.00%.

The above obtained binder compositions were used in preparing coating compositions below with different PVCs.

Examples (Exs) 1-10 and Comparative (Comp) Exs A-D and G Coating Composition

Coating compositions (Exs 1-5, and Comp Exs A-D and G) having 60% PVC were prepared based on formulations listed in Table 3. The as prepared binder compositions were used for preparing each coating composition, according to formulations given in Table 6. Ingredients for grind were mixed using a high speed Cowles disperser. Then ingredients for letdown were added and mixed by a conventional agitator.

TABLE 3

| Typical 60% PVC formulation | |
|---|---|
| Coating Composition | Kilograms |
| Grind | |
| Water | 125.00 |
| Natrosol 250 MBR (100%) | 2.00 |
| AMP-95 | 1.20 |
| Propylene glycol | 20.00 |
| OROTAN 731A | 8.40 |
| KATHON LXE | 1.50 |
| TRITON CF-10 | 2.00 |
| Foamaster NXZ | 1.00 |
| ACRYSOL RM-2020 NPR | 4.40 |
| Ti-Pure R-706 | 120.00 |
| CC-700 | 180.00 |
| Grind Sub-total | 465.50 |
| Letdown | |
| Water | 51.32 |
| Binder Composition (with or without wax emulsion) | 200.00 |
| ROPAQUE Ultra E | 80.00 |
| TEXANOL | 10.80 |
| Foamaster NXZ | 0.40 |
| ACRYSOL ASE-60 | 8.92 |
| ACRYSOL RM-8W | 1.20 |
| Water | 181.86 |
| Total | 1000 |

Exs 6-9 and Comp Ex H Coating Composition

Coating compositions with other PVCs, for example, 58% (Ex 6), 60% (Ex 7), 65% (Ex 8), 68% (Ex 9) and 71% (Comp Ex H), were also obtained based on the procedure and formulations for preparing 60% PVC coating compositions such as Ex 1, except that the amounts of water and the binder composition used are different and given in Table 4. Binder compositions used for preparing the coating compositions are given in Table 6.

TABLE 4

| Amounts of water and binders used in coating compositions | | | | | |
|---|---|---|---|---|---|
| Example | Ex 6 | Ex 7 | Ex 8 | Ex 9 | Comp Ex H |
| PVC | 58% | 60% | 65% | 68% | 71% |
| Water (g) | 41.32 | 51.32 | 91.32 | 111.32 | 131.32 |
| Binder (g) | 210.00 | 200.00 | 160.00 | 140.00 | 120.00 |

Comp Exs F and G Coating Composition

Coating compositions having 17% PVC were prepared according to the same procedure as preparing 60% PVC coating compositions, based on formulations given in Table 5. Binder compositions used for preparing the coating compositions are given in Table 6.

TABLE 5

17% PVC coating composition

| Material Name | Kilograms |
|---|---|
| Grind | |
| Water | 25.00 |
| Propylene glycol | 25.00 |
| AMP-95 | 2.00 |
| Tego Foamex 825 | 2.00 |
| OROTAN 731A | 8.80 |
| TRITON BD-405 | 2.00 |
| Ti-Pure R-706 | 220.00 |
| Grind Sub-total | 284.80 |
| LetDown | |
| Binder | 605.60 |
| TEXANOL | 43.60 |
| ACRYSOL RM-2020 NPR | 5.38 |
| AMP-95 | 1.84 |
| Water | 58.78 |
| Total | 1000.00 |

The above obtained coating compositions were tested for beading effects and stain resistance according to the test methods described above and results are given in Table 6.

As shown in the Table 6, the coating compositions of Comp Exs A-D and Ex 1 all had a PVC of 60% and included 6% wax. The coating compositions of Comp Exs A and D comprising the emulsion polymers made from non-reactive surfactant (DS-4) or conventional reactive surfactant (SR-10), respectively, both didn't provide coating films with any beading effect (beading effect score: 0). The coating compositions of Comp Exs B and C comprising the emulsion polymers made from reactive phosphate surfactants (MAX-EMUL 6112 and PP-7025, respectively) only provided coating films with the beading effect score of 2.5. In contrast, the coating composition of Ex 1 with a PVC of 60% comprising the emulsion polymer made from AR-1025 reactive surfactant provided coating films with surprisingly good beading effect (beading effect score: 5). At the same time, the coating films of Ex 1 also showed much better or comparable stain resistance than the other binders with the conventional non-reactive or reactive surfactants. In addition, the coating compositions of Exs 2-9, even with PVC up to 68%, comprising emulsion polymers made from AR-1025 with the wax loading ranging from 2% to 15% all provided coating films with good beading effect with beading effect scores of 4 or higher.

It is also found that the coating compositions comprising emulsion polymers made from DS-4 surfactant (Comp Ex E) or AR-1025 surfactant (Comp Ex F), both without E340 wax, provided coating films with no beading effect, even at low PVC contents (17% PVC). The coating composition of Comp Ex G comprising the emulsion polymer made from AR-1025 surfactant but with 1% wax provided coating films with unsatisfactory beading effect. The coating composition of Comp Ex H with a PVC of 71% resulted in coating films with a beading effect score of only 2.

Therefore, it is believed that synergetic effects between AR-1025 surfactant, the wax and the pigment resulted in surprisingly improved beading effects and good stain resistance.

TABLE 6

Coating compositions and properties of coatings

| | | Binder Composition | | | Properties | |
|---|---|---|---|---|---|---|
| Example | PVC | Binder ID | Emulsion polymer[1] | Surfactant in preparation of emulsion polymer | Wax emulsion[2] | Beading effect score | Stain resistance |
| Comp Ex A | 60% | Binder 2 | 47.7ST/50BA/2AA/0.3SSS | DS-4 | 6% E340 | 0 | 31 |
| Comp Ex B | 60% | Binder 3 | 46.7ST/50BA/2AA/0.3SSS/1MAXEMUL6112 | MAXEMUL 6112 | 6% E340 | 2.5 | 32 |
| Comp Ex C | 60% | Binder 4 | 46.7ST/50BA/2AA/0.3SSS/1PP-7025 | PP-7025 | 6% E340 | 2.5 | 37 |
| Comp Ex D | 60% | Binder 5 | 46.7ST/50BA/2AA/0.3SSS/1SR-10 | SR-10 | 6% E340 | 0 | 34 |
| Comp Ex E | 17% | Binder 7 | 47.7ST/50BA/2AA/0.3SSS | DS-4 | no wax | 0 | NA |
| Comp Ex F | 17% | Binder 6 | 46.7ST/50BA/2AA/0.3SSS/1AR-1025 | AR-1025 | no wax | 0 | NA |
| Comp Ex G | 60% | Binder 1B | | AR-1025 | 1% E-340 | 3.5 | 37 |
| Comp Ex H | 71% | Binder 1D | | AR-1025 | 3% E-340 | 2 | 26 |
| Ex 1 | 60% | Binder 1A | | AR-1025 | 6% E-340 | 5 | 37 |
| Ex 2 | 60% | Binder 1C | | AR-1025 | 2% E-340 | 5 | 37 |
| Ex 3 | 60% | Binder 1D | | AR-1025 | 3% E-340 | 5 | 37 |
| Ex 4 | 60% | Binder 1E | | AR-1025 | 10% E-340 | 5 | 39 |

TABLE 6-continued

Coating compositions and properties of coatings

| | | Binder Composition | | | | Properties | |
|---|---|---|---|---|---|---|---|
| Example | PVC | Binder ID | Emulsion polymer[1] | Surfactant in preparation of emulsion polymer | Wax emulsion[2] | Beading effect score | Stain resistance |
| Ex 5 | 60% | Binder 1F | | AR-1025 | 15% E-340 | 5 | 41 |
| Ex 6 | 58% | Binder 1D | | AR-1025 | 3% E-340 | 5 | 40 |
| Ex 7 | 60% | Binder 1D | | AR-1025 | 3% E-340 | 5 | 37 |
| Ex 8 | 65% | Binder 1D | | AR-1025 | 3% E-340 | 4 | 32 |
| Ex 9 | 68% | Binder 1D | | AR-1025 | 3% E-340 | 4 | 29 |

[1] percentage by weight based on the dry weight of the emulsion polymer;
[2] by solids weight based on the dry weight of the emulsion polymer

What is claimed is:

1. An aqueous coating composition comprising:
   (A) an emulsion polymer comprising, based on the dry weight of the emulsion polymer, structural units of a polymerizable surfactant having the structure of formula (I),

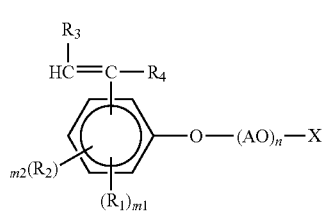

(I)

wherein $R_1$ is a phenyl group or a phenyl substituted alkyl group; m1 is 1, 2, 3 or 4; $R_2$ is an alkyl or a substituted alkyl; m2 is 0 or 1; $R_3$ is hydrogen or a $C_1$-$C_{20}$ alkyl group; $R_4$ is hydrogen or a $C_1$-$C_{20}$ alkyl group; A represents an alkylene group or a substituted alkylene group, having 2 to 4 carbon atoms; n is an integer in the range of from 1 to 100; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$-COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue;
   (B) a wax emulsion in an amount of from 1.1% to 20% by solids weight, based on the dry weight of the emulsion polymer; and
   (C) a pigment;
   wherein the aqueous coating composition has a pigment volume concentration of from 56% to 70%.

2. The aqueous coating composition of claim 1, wherein the emulsion polymer comprises, based on the dry weight of the emulsion polymer, from 0.5% to 5% by weight of structural units of the polymerizable surfactant.

3. The aqueous coating composition of claim 1, wherein the polymerizable surfactant has the structure of formula (I), wherein $R_1$ is

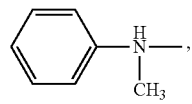

and $m_1$ is 1, 2, or 3.

4. The aqueous coating composition of claim 1, wherein A represents an ethylene group and n is an integer in the range of from 5 to 20.

5. The aqueous coating composition of claim 1, wherein the wax emulsion is a paraffin wax emulsion.

6. The aqueous coating composition of claim 1, wherein the wax emulsion is present in an amount of from 6% to 20% by solids weight, based on the dry weight of the emulsion polymer.

7. The aqueous coating composition of claim 1, wherein the emulsion polymer has a glass transition temperature of from 0 to 50° C.

8. The aqueous coating composition of claim 1, wherein the aqueous coating composition has a pigment volume concentration of from 58% to 68%.

9. A method of improving the beading effect of a substrate comprising:
   forming an aqueous coating composition of any one of claims 1-8,
   applying the aqueous coating composition to a substrate, and
   drying, or allowing to dry the aqueous coating composition, wherein the coated substrate has a beading score of 4 or above and a stain removal score of 25 or higher.

10. The method of claim 1 wherein the pigment comprises only unencapsulated pigments.

11. The method of claim 1 wherein the pigment is a particulate inorganic material.

* * * * *